(12) United States Patent
Bolus et al.

(10) Patent No.: US 11,949,334 B2
(45) Date of Patent: Apr. 2, 2024

(54) POWER CONVERTER WITH DCR SENSING CIRCUIT HAVING IMPROVED NOISE IMMUNITY

(71) Applicant: Apple Inc., Cupertino, CA (US)

(72) Inventors: Jonathan F. Bolus, San Francisco, CA (US); Alberto Alessandro Angelo Puggelli, Cupertino, CA (US); Fabio Gozzini, San Jose, CA (US); Hao Zhou, San Jose, CA (US)

(73) Assignee: Apple Inc., Cupertino, CA (US)

( * ) Notice: Subject to any disclaimer, the term of this patent is extended or adjusted under 35 U.S.C. 154(b) by 114 days.

(21) Appl. No.: 17/644,521

(22) Filed: Dec. 15, 2021

(65) Prior Publication Data

US 2023/0188035 A1   Jun. 15, 2023

(51) Int. Cl.
  *H02M 3/158* (2006.01)
  *H02M 1/00* (2006.01)

(52) U.S. Cl.
  CPC ......... *H02M 3/158* (2013.01); *H02M 1/0009* (2021.05); *H02M 3/1584* (2013.01)

(58) Field of Classification Search
  CPC ............................ H02M 3/158; H02M 1/0009
  See application file for complete search history.

(56) References Cited

U.S. PATENT DOCUMENTS

| | | | |
|---|---|---|---|
| 7,233,132 B1 * | 6/2007 | Dong ................. | H02M 3/1584 323/272 |
| 7,508,182 B1 | 3/2009 | Chang | |
| 8,072,200 B1 * | 12/2011 | Qiu ..................... | H02M 3/1584 323/907 |
| 8,823,352 B2 | 9/2014 | Zhang | |
| 9,525,351 B2 | 12/2016 | Li et al. | |
| 9,748,843 B2 | 8/2017 | Zhang et al. | |
| 9,793,800 B1 * | 10/2017 | Yan ....................... | H02M 3/157 |
| 2009/0039856 A1 | 2/2009 | Wang et al. | |
| 2013/0307511 A1 * | 11/2013 | De Vries ............. | H02M 3/1563 323/284 |
| 2014/0375288 A1 * | 12/2014 | Nora ...................... | H02J 1/102 323/272 |
| 2016/0012965 A1 * | 1/2016 | Jiang ..................... | H01F 27/402 336/105 |
| 2016/0087531 A1 * | 3/2016 | Zhang ................. | H02M 3/1582 323/271 |
| 2017/0063239 A1 * | 3/2017 | Wu ..................... | H02M 3/1584 |

* cited by examiner

*Primary Examiner* — Alex Torres-Rivera
(74) *Attorney, Agent, or Firm* — Kowert, Hood, Munyon, Rankin & Goetzel, P.C.; Dean M. Munyon (57) ABSTRACT

A power converter is disclosed. The power converter includes a switching circuit configured to source current to a switch node that is coupled, via an inductor, to a regulated power supply node. A DC resistance sensing circuit includes a first filter and a second filters. The first filter circuit is configured to filter a voltage level of a first terminal of the inductor to generate a first filtered signal, while the second filter circuit is configured to filter a voltage level of a second terminal of the inductor to generate a second filtered signal. A control circuit is configured to adjust the operation of the switching circuit using a voltage level of the regulated power supply node, the first filtered signal, and the second filtered signal.

20 Claims, 6 Drawing Sheets

POWER CONVERTER WITH DCR SENSING CIRCUIT HAVING IMPROVED NOISE IMMUNITY

BACKGROUND

Technical Field

This disclosure is directed to electronic circuits, and more particularly, to DC-DC converter circuits.

Description of the Related Art

Computing systems may include one or more systems-on-a-chip (SoC), each of which may integrate a number of different functions onto a single integrated circuit. Various SoCs and/or various functional blocks on a given SoC may utilize power signals of different voltage levels. Since computing systems may include a single power source with a given output voltage level, one or more voltage converters or voltage regulators may be used to generate the power signals of different voltage levels.

Voltage regulation circuits implemented in a given computing system may be designed according to one of various design styles and types. Types of circuits for converting a DC power signal with a first voltage to a DC power signal with a second voltage include linear regulators and switching regulators. Buck converters, sometimes also referred to as buck regulators, are one example of a switching regulator.

Switching converters typically include inductors through which current pulses are sourced. The inductor current is sometimes measure in order to implement a current-control loop or a peak current limit. One method for measuring the inductor current is direct current resistance (DCR) sensing, which exploits the non-zero series resistance of the inductor to create a voltage proportional to the inductor current.

SUMMARY

A power converter is disclosed. In one embodiment, a power converter includes a switching circuit configured to source current to a switch node that is coupled, via an inductor, to a regulated power supply node. A first filter circuit is configured to filter a voltage level of a first terminal of the inductor to generate a first filtered signal, while a second filter circuit is configured to filter a voltage level of a second terminal of the inductor to generate a second filtered signal. A control circuit is configured to adjust the operation of the switching circuit using a voltage level of the regulated power supply node, the first filtered signal, and the second filtered signal.

In various embodiments, the first and second filters comprise a DC resistance sensing circuit. Such embodiments may further include a measurement circuit coupled between the first and second filters. The measurement circuit is configured to measure a voltage between a terminal of the first filter and a terminal of the second filter, wherein the voltage is proportional to the current through the inductor. The control circuit may use the measured voltage as a representation of the inductor current, along with one or more current threshold values, to perform current mode control of the power converter.

BRIEF DESCRIPTION OF THE DRAWINGS

The following detailed description makes reference to the accompanying drawings, which are now briefly described.

DETAILED DESCRIPTION OF EMBODIMENTS

The present disclosure is directed to power converters that use DC resistance (DCR) sensing to measure a current through a corresponding inductor or inductors. In some embodiments, the measured current may be used as feedback in power converters that utilize current mode control to operate the switches by, e.g., adjusting a frequency and/or a width at which pulses are sourced.

DCR (DC resistor) sensing is used in many types of switching power converters to measure instantaneous inductor current for control (e.g., when current mode control is used) and may be used for other purposes. Some power converters implement DCR circuits by placing an RC circuit in parallel with the inductor, with the instantaneous voltage across the capacitor of the RC circuit being proportional to the instantaneous inductor current. However, a parasitic inductance that exists between the output of the power converter and the load capacitance can cause distortion that feeds back into the RC circuit. In particular, a square wave having the same frequency as the switching circuit may be generated on the regulated supply voltage node. This unwanted signal may feed back into the RC circuit, adversely affecting the current measurement. This in turn hampers the ability to obtain accurate inductor current measurements and thus to perform effective current mode control.

The present disclosure makes use of the insight that low-pass filtering can be used to eliminate the square wave noted above by filtering out signal components at the frequency of the switching circuit. Accordingly, the present disclosure implements a power converter having separate low-pass filters coupled to each terminal of the power converter inductor. In some embodiments, the low-pass filters may be RC low-pass filters, with each of the low-pass filters having a sense node at the junction or a resistor and a capacitor. A measurement circuit may be coupled between respective sense nodes of the low-pass filters. The voltage between the respective sense nodes of the low-pass filter is directly proportional to the inductor current. Accordingly, the measurement circuit measures the voltage between the sense node, and may provide an indication of the measured voltage as a feedback signal to a control circuit. The control circuit may adjust the switching of a switching circuit (e.g., by frequency, pulse width, or both) to control the current through the inductor, as well as to regulate an output supply voltage.

Discussion of various embodiments of a power converter using the disclosed techniques of DCR sensing begins with reference to a block diagram of one embodiment. Various embodiments of a power converter using the disclosed DCR sensing technique are then discussed with reference to corresponding schematic diagrams, including a coupled-inductor embodiment. A method for performing DCR sensing is then discussed. The disclosure concludes with discussion of an example system that may include various embodiments of a power converter as disclosed herein.

Figure 1:
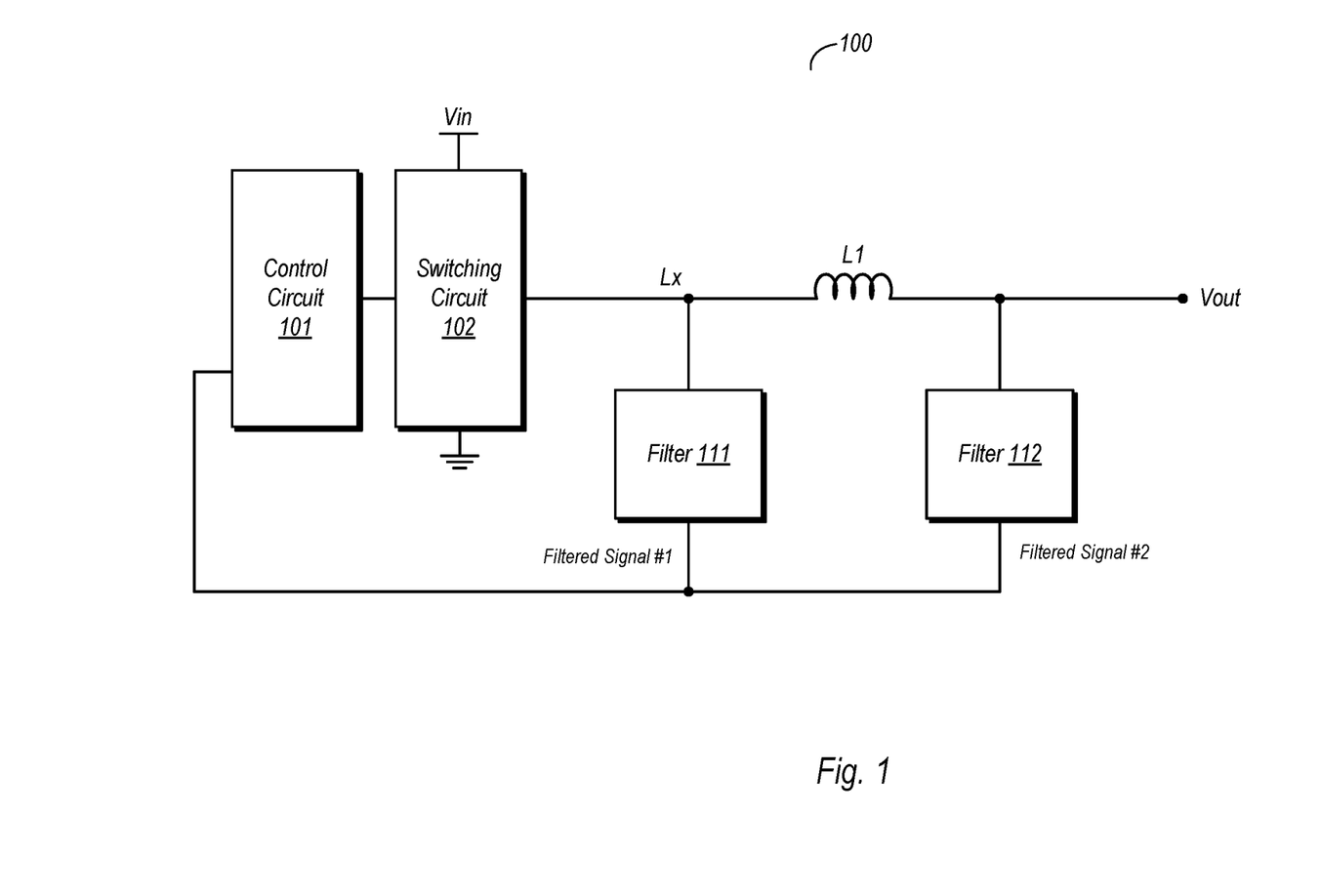
FIG. 1 is a block diagram of one embodiment of a power converter.

Power Converter with DCR Sensing Using Low Pass Filters:

FIG. 1 is a block diagram of one embodiment of a power converter. In the embodiment shown, power converter 100 includes a control circuit 101, a switching circuit 102, filters 111 and 112, and an inductor L1. Power converter 100 is configured to generate a regulated supply voltage on a regulated supply voltage node, Vout.

Switching circuit 102 in the embodiment shown is configured to source current pulses to inductor L1. Although not explicitly shown here, switching circuit 102 may include a high side switch and a low side switch, one of which may be active at a given time. When the high side switch is active, the input voltage, Vin, is coupled to the switching node Lx. As a result, inductor L1 is magnetized during this time. When the low side switch is active, switching node Lx is coupled to ground, and thus inductor L1 is demagnetized. The high side and low side switches of switching circuit 102 may be alternately activated and deactivated by control circuit 101. Through this operation, a regulated supply voltage may be provided on Vout. The control of switching circuit 102 by control circuit 101 may be carried out to maintain the regulated supply voltage within a specified range, while also meeting the demands of a load circuit coupled to receive the regulated supply voltage.

As shown in FIG. 1, power converter 100 includes a first filter 111 and a second filter 112 coupled to the switching node and the regulated supply voltage node, respectively. In one embodiment, first filter 111 and second filter 112 may perform low-pass filtering of the signals on their respectively coupled nodes. Filter 111 is configured to generate a filtered signal #1, while filter 112 is configured to generate a filtered signal #2. Using these filtered signals, the current through inductor L1 can be determined. For example, a sense voltage can be measured between the two filtered signals. The sense voltage is a product of the inductor current and the inductor's DC resistance. Accordingly, this voltage is directly proportional to the inductor current and can thus be used as an indication of the same. This value may be fed back to control circuit 101 and used as a basis for controlling the switching circuit 102. More particularly, embodiments of control circuit 101 may carry out current mode control using the feedback provided that is based on the inductor current.

Figure 2:
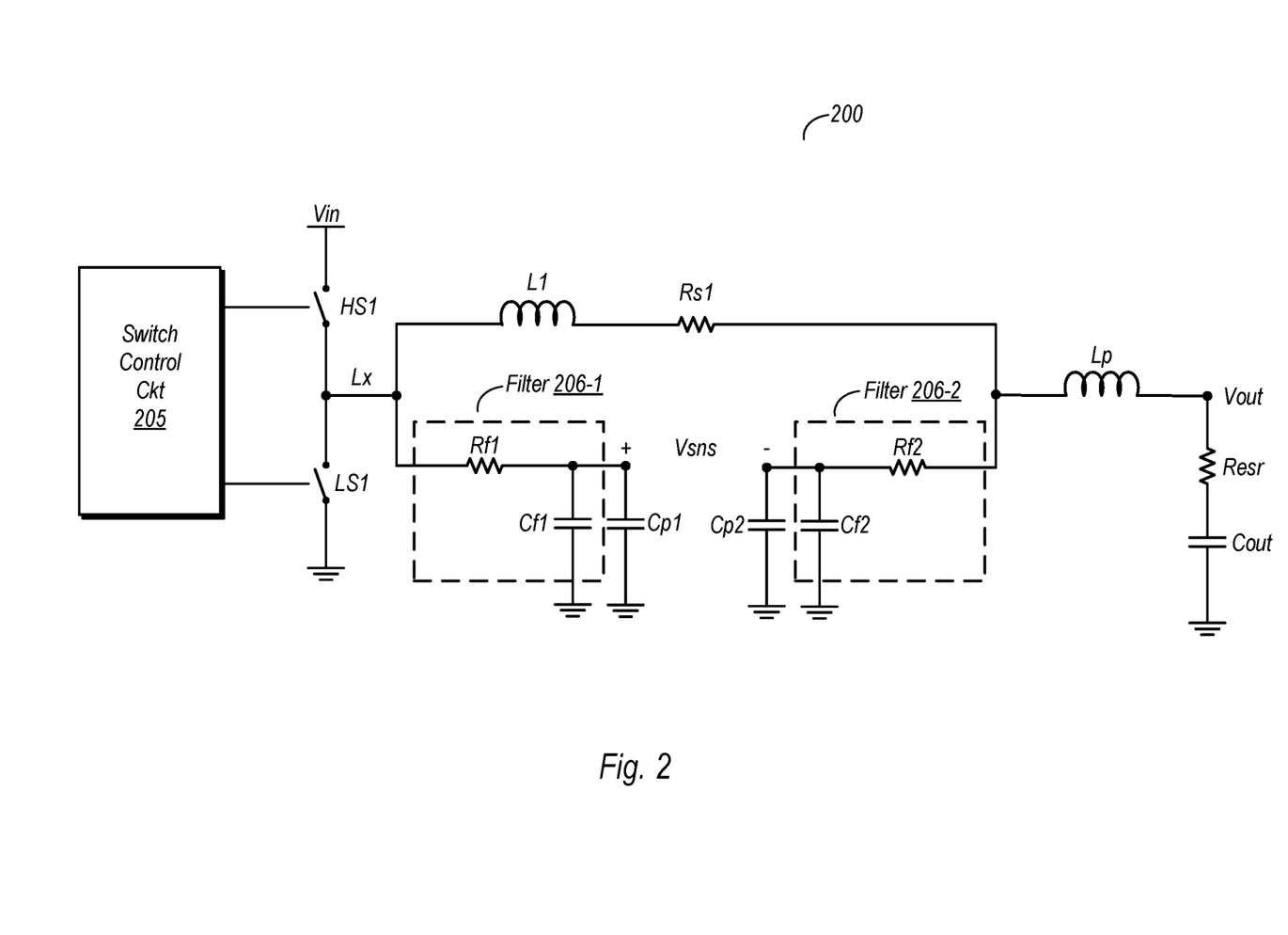
FIG. 2 is a schematic diagram of one embodiment of a power converter with DC resistance sensing circuitry.

Schematic Diagrams of Power Converters with DCR Sensing Circuitry:

FIG. 2 is a schematic diagram of one embodiment of a switching power converter having DCR sensing circuitry for measuring inductor current. In the embodiment shown, power converter 200 includes a switch control circuit 205 that is coupled to control a high side switch HS1 and a low side switch LS1. The high side and low side switches HS1 and LS1, respectively, are coupled to one another at a switching node Lx. The high side switch HS1 is further coupled to receive an input voltage Vin from a corresponding input voltage node. Meanwhile, the low side switch LS1 is further coupled to ground.

An inductor L1 is coupled between the switching node Lx and a regulated supply voltage node. The resistor Rs1 is representative of the series resistance of inductor L1. Meanwhile, the inductor LP is representative of a parasitic inductance between the actual inductor L1 and the regulated supply voltage node, Vout. Capacitor Cout in the embodiment shown represents the load capacitance, while Resr is representative of the equivalent series resistance of the load capacitance.

Power converter 200 in the embodiment shown includes filters 206-1 and 206-2. Filter 206-1 in the embodiment shown is coupled between the switching node Lx and ground. Filter 206-2 in the embodiment shown is coupled between the regulated supply voltage node Vout (via the parasitic inductance Lp in this example) and ground. Both filters 206-1 and 206-2 in the illustrated embodiment are RC (resistive-capacitive) low-pass filters. Filter 206-1 is implemented using resistor Rf1 and capacitor Cf1. A parasitic capacitance Cp1 is also present, in parallel with Cf1. Filter 206-2 is implemented using Rf2 and capacitor Cf2, with a parasitic capacitance Cp2 in parallel with Cf2. Filter 201-1 and 206-2 include filter (or sense) nodes, "+" and "−" respectively at the corresponding junctions of their respective resistor and capacitor. A voltage, Vsns, between these two filter nodes is proportional to the inductor current through L1, as it corresponds to the product of inductor current multiplied by the DC resistance of L1. Accordingly measurement of this voltage may yield the inductor current.

The parasitic components Lp, Cp1, Cp2, and Resr in the embodiment shown have non-zero values, and thus can introduce distortion into signals on their respectively coupled nodes. In embodiments in which a single DCR sensing circuit is implemented (instead of the two separate filters shown here), this distortion can have an adverse impact on inductor current measurement. The primary source of this distortion is due to periodic noise that may be generated on the node between inductor L1 and the parasitic inductance Lp. As the switching node Lx alternates between the potentials of Vin and ground, due to the switching operation of HS1 and LS1, the periodic noise between L1 and Lp due to an inductive divider that is formed between their respective inductances. This noise may be coupled, via capacitances (including parasitic capacitances) to a sense node where the inductor current is measured. Thus, the noise introduces an error into the measured inductor current, and therefore negatively impacts the ability to perform current mode control.

The use of two filters, and thus two branches of DCR sensing circuitry may largely eliminate the problems described above. Compensation for the two parasitic capacitances, Cp1 and Cp2, can be obtained by corresponding adjustments to the values of Cf1 and Cf2, respectively. Furthermore, the transfer function between inductor LP and the negative sense terminal of filter 206-2 may reduce any induced high frequency noise to a negligible value. Accordingly, the sense voltage, Vsns, may be accurately measured, thereby enabling a more accurate value of the inductor current to be ascertained.

Figure 3:
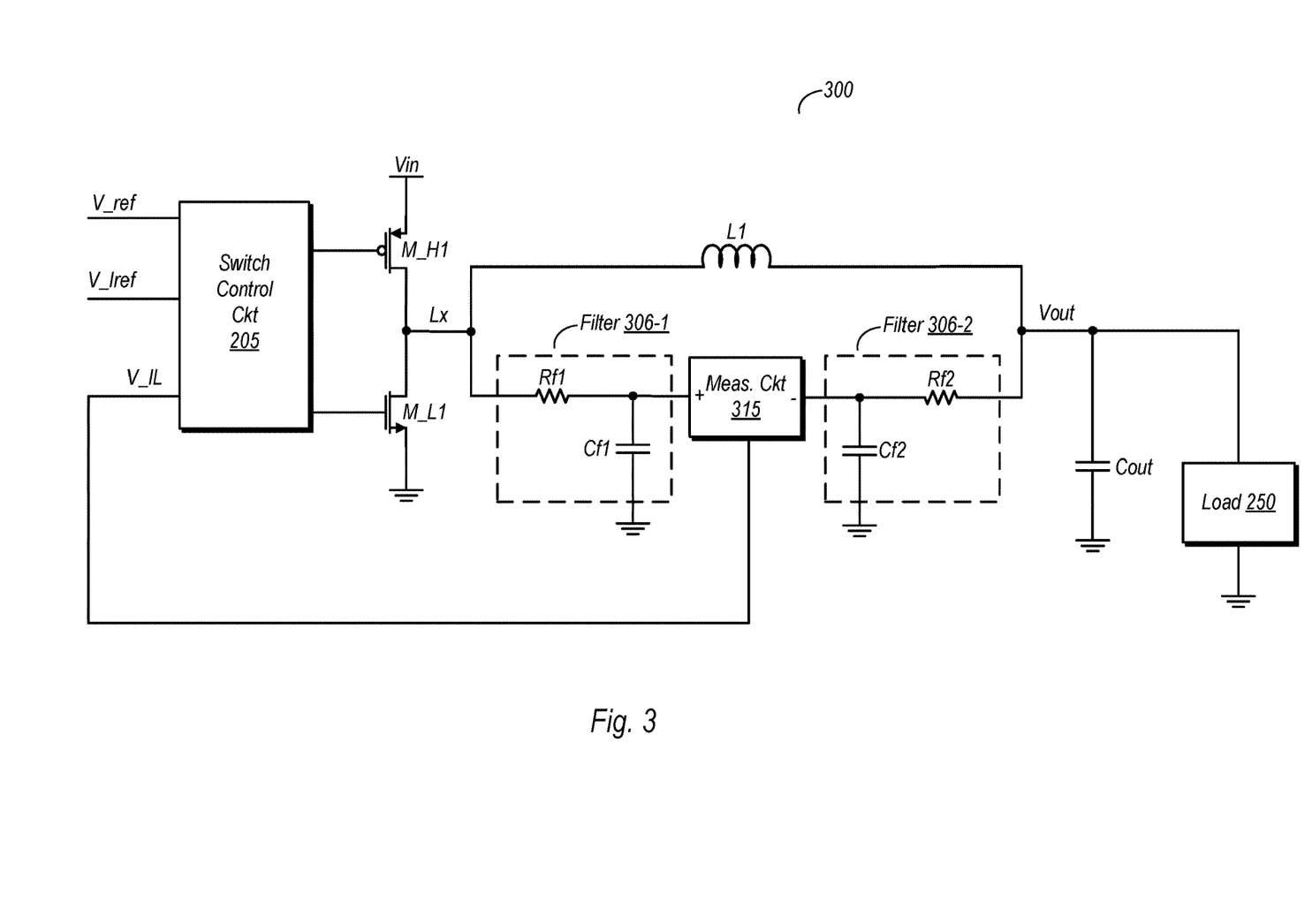
FIG. 3 is a schematic diagram of one embodiment of a power converter having DC resistance sensing circuitry and a measurement circuit.

FIG. 3 is a schematic diagram of another embodiment of a power converter. For the sake of simplicity, the parasitic components illustrated in FIG. 2 are not shown here. In the embodiment shown, a high side switch is implemented with a PMOS transistor, M_H1, while a low side switch is implemented using NMOS transistor M_L1. The switching node Lx is coupled to inductor L1, which in turn is coupled to the regulated supply voltage node, Vout. An output capacitance, Cout is coupled to the regulated supply voltage, as is a load circuit 250. The load circuit 250 may be any type of analog, digital, or mixed signal circuitry that utilizes the regulated supply voltage provided by power converter 300.

Power converter 300 includes filters 306-1 and 306-2, which are RC low-pass filters that implement DCR sensing circuitry. A measurement circuit 315 is coupled between the two filters, and is configured to measure the voltage difference between the "+" terminal (of filter 306-1) and the "−" terminal (of filter 306-2). This voltage may be directly proportional to the inductor current (through L1), and thus provides an indication of the same. As shown in FIG. 3, this value is fed back to switch control circuit 205 as the value V_IL. Switch control circuit 205 in the embodiment shown is also coupled to receive at least one current threshold value (or limit) represented as the voltage V_Iref. Switch control circuit 205 may include comparison circuitry may compare the two current-based voltages and adjust operation of the switching circuit (namely M_H1 and M_L1) based on the comparisons. Adjustments may include switching the respective states of both the high and low side switches (e.g., deactivating one while activating the other), changing a frequency at which the switches change state or changing the width at which current pulses are sourced.

In some embodiments, the current threshold value provided as voltage V_Iref may represent either a peak current threshold or a valley current threshold, either of which may be used to determine when to change the respective states of the high and low side switches. Embodiments are also possible and contemplated wherein multiple current thresholds (again, provided as voltage values similar to V_Iref) are provided. For example, embodiments that perform hysteretic current mode control may receive voltages representing both a peak current threshold and a valley current threshold. Switch control circuit 205 in the embodiment shown is also configured to receive a voltage threshold value, Vref, that is indicative of the desired output supply voltage.

It is noted that the embodiments of a power converter shown in FIGS. 2 and 3 may be buck converters. However, embodiments are possible and contemplated in which the DCR sensing circuitry disclosed herein is applied to boost converters as well.

Figure 4:
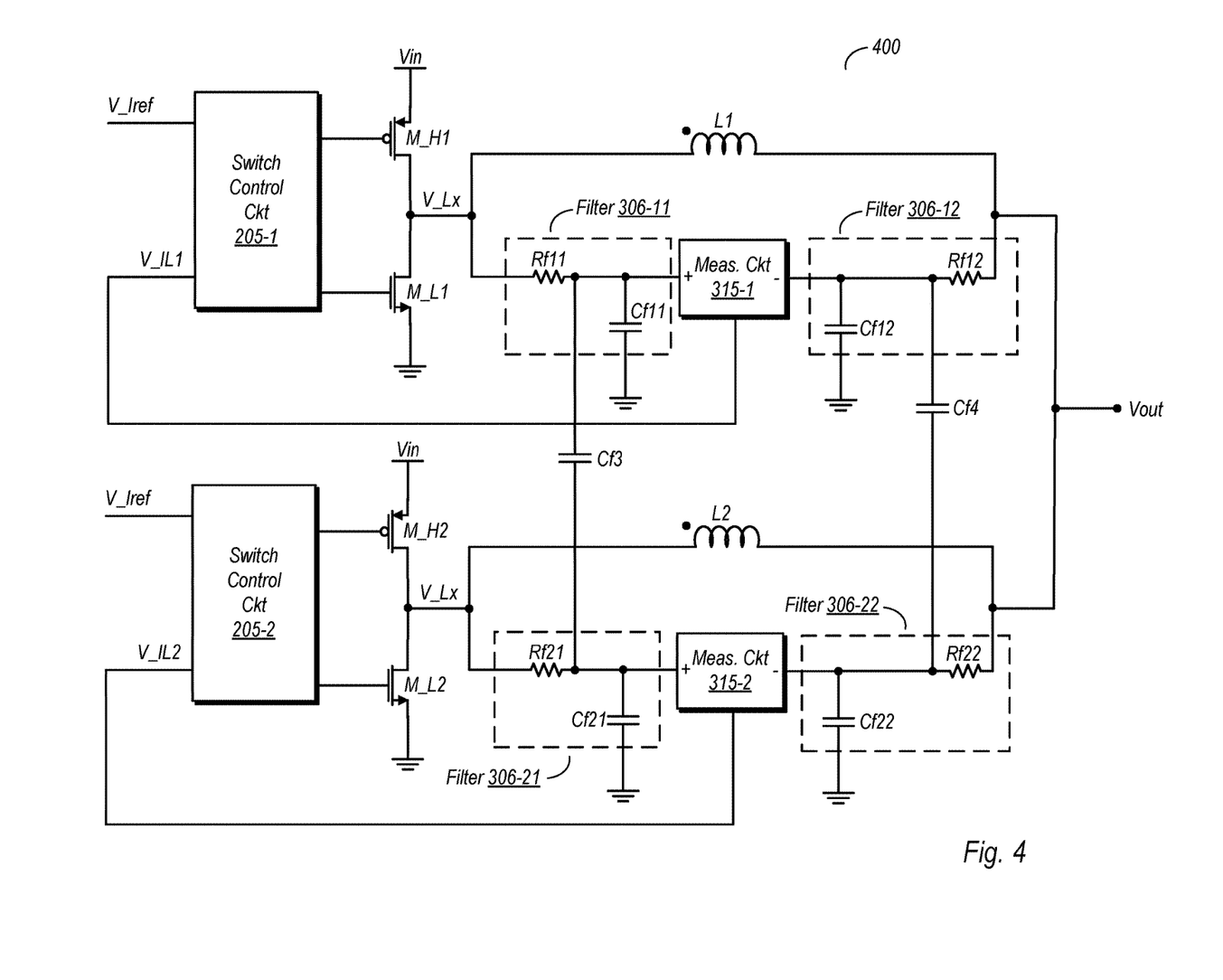
FIG. 4 is a schematic diagram of one embodiment of a coupled-inductor power converter having DC resistance sensing circuitry and a measurement circuit.

FIG. 4 is a schematic diagram of another embodiment of a power converter utilizing DCR sensing circuitry in accordance with this disclosure. In the embodiment shown, power converter 400 is a coupled-inductor power converter. The two inductors in the illustrated embodiment, L1 and L2, may share a magnetic core, and thus also share magnetic fields. Furthermore, the inductors are both electrically coupled to the regulated supply voltage node, Vout.

The coupled-inductor power converter 400 includes first and second switch control circuits 206-1 and 206-2, each of which is configured to control corresponding high side and low side switches (M_H1 and M_L1 for switch control circuit 206-1, M_H2 and M_L2 for switch control circuit 206-2). In various embodiments, a single switch control circuit may be implemented to control both sets of switches. In other embodiments, the switch control circuits 206-1 and 206-2 may be configured to communicate with one another to coordinate their operation (e.g., one causes a current pulse to be sourced to magnetize its inductor while the other one causes its inductor to be demagnetized).

In the embodiment shown, filters 306-11 and 306-12 are associated with inductor L1, while filters 306-21 and 306-22 are associated with inductor L2. Filter 306-1 includes resistor Rf11 and capacitor Cf11. Filter 306-12 includes resistor Rf12 and capacitor Cf12. Filter 306-21 includes resistor Rf21 and capacitor Cf21. Filter 306-22 includes resistor Rf22 and capacitor Cf22. An additional capacitor Cf3 is coupled between filter 306-11 and 306-21. Similarly, an additional capacitor Cf4 is coupled between filter 306-21 and 306-22. Capacitors Cf3 and Cf4 in the embodiment shown may emulate the coupling between inductors L1 and L2. Since a voltage applied across inductor L1 can induce a current in inductor L2 (and vice versa), these currents need to be accounted for in order to generate an accurate representation of inductor current. It is noted that in the special case in which the coupling factor between inductors L1 and L2 is zero, capacitors Cf3 and Cf4 may be eliminated.

Accordingly, measurement circuit 315-1 is configured to measure the voltage between the respective filter nodes of filters 306-11 and 306-12 in order to determine the inductor current through L1. This voltage is provided as feedback signal V_IL1 to switch control circuit 206-1. Similarly, measurement circuit 315-2 is configured to measure the voltage between respective filter nodes of filters 306-21 and 306-22 in order to determine the inductor current through L2. The measured value from measurement circuit 315-2 is provided as a feedback signal V_IL2 to switch control circuit 206-2.

It is noted that while the circuits discussed above have been implemented using NMOS and PMOS transistors, the disclosure is not intended to limit embodiments falling within its scope to these types of devices. Thus, in addition to various MOSFET types discussed above, the present disclosure also contemplates embodiments that use non-planar devices such as FinFETs, GAAFETs (Gate All Around FETs), among other types.

Embodiments implemented using Bipolar devices are also possible and contemplated. The disclosure further contemplates that technologies that are speculative or not widely used as of this writing may be used to implement devices in various embodiments of the circuits discussed herein. These technologies include (but are not limited to) graphene transistors, carbon nanotube transistors, gallium arsenide transistors, and so on. The use of memristors in certain circuit structures is also possible and contemplated.

Figure 5:
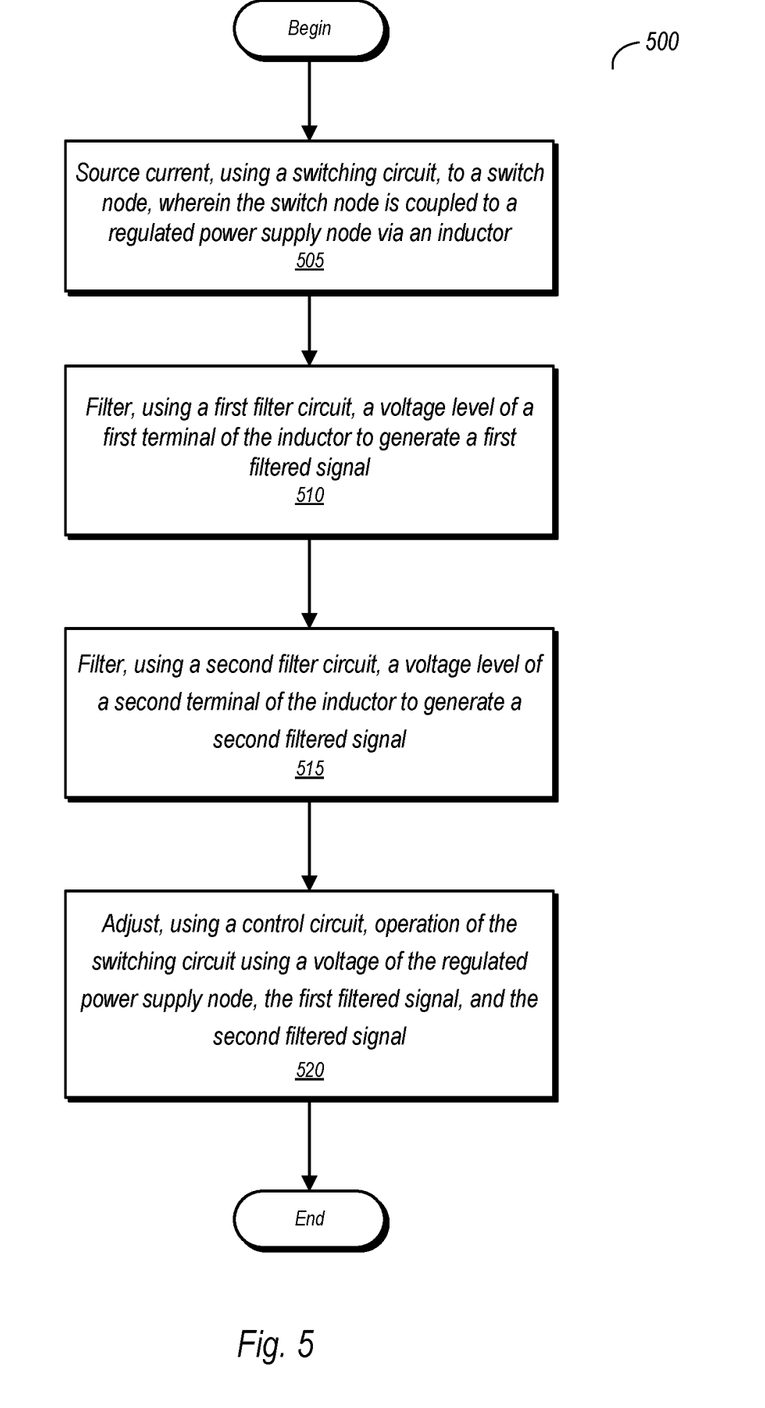
FIG. 5 is a flow diagram of one embodiment of a method for operating a power converter having DC resistance sensing circuitry and a measurement circuit.

Method for Operating Power Converter with DCR Sensing Circuitry:

FIG. 5 is a flow diagram of one embodiment of a method for operating a power converter having DCR sensing circuitry. Method 500 may be performed with any of the various circuit embodiments discussed above. Additionally, embodiments of a circuit capable of carrying out Method 500, but not explicitly disclosed herein, are also considered to fall within the scope of this disclosure.

Method 500 begins with sourcing current, using a switching circuit, to a switch node, wherein the switch node is coupled to a regulated power supply node via an inductor (block 505). The method further includes filtering, using a first filter circuit, a voltage level of a first terminal of the inductor to generate a first filtered signal (block 510), and filtering, using a second filter circuit, a voltage level of a second terminal of the inductor to generate a second filtered signal (block 515). The method also includes adjusting, using a control circuit, operation of the switching circuit using a voltage of the regulated power supply node, the first filtered signal, and the second filtered signal (block 520).

In various embodiments, the method includes measuring, using a measurement circuit, a voltage difference between the first filtered signal and the second filtered signal, wherein the voltage difference is proportional to a current through the inductor. Embodiments may also include the control circuit adjusting operation of the switching circuit based on comparisons of the voltage difference and one or more inductor current threshold values. In adjusting operation of the switching circuit, the method may include the control circuit controlling the amount of current through the inductor. Generating the first and second filtered signals in various embodiments includes low-pass filtering voltage levels on the first and second terminals, respectively.

Figure 6:
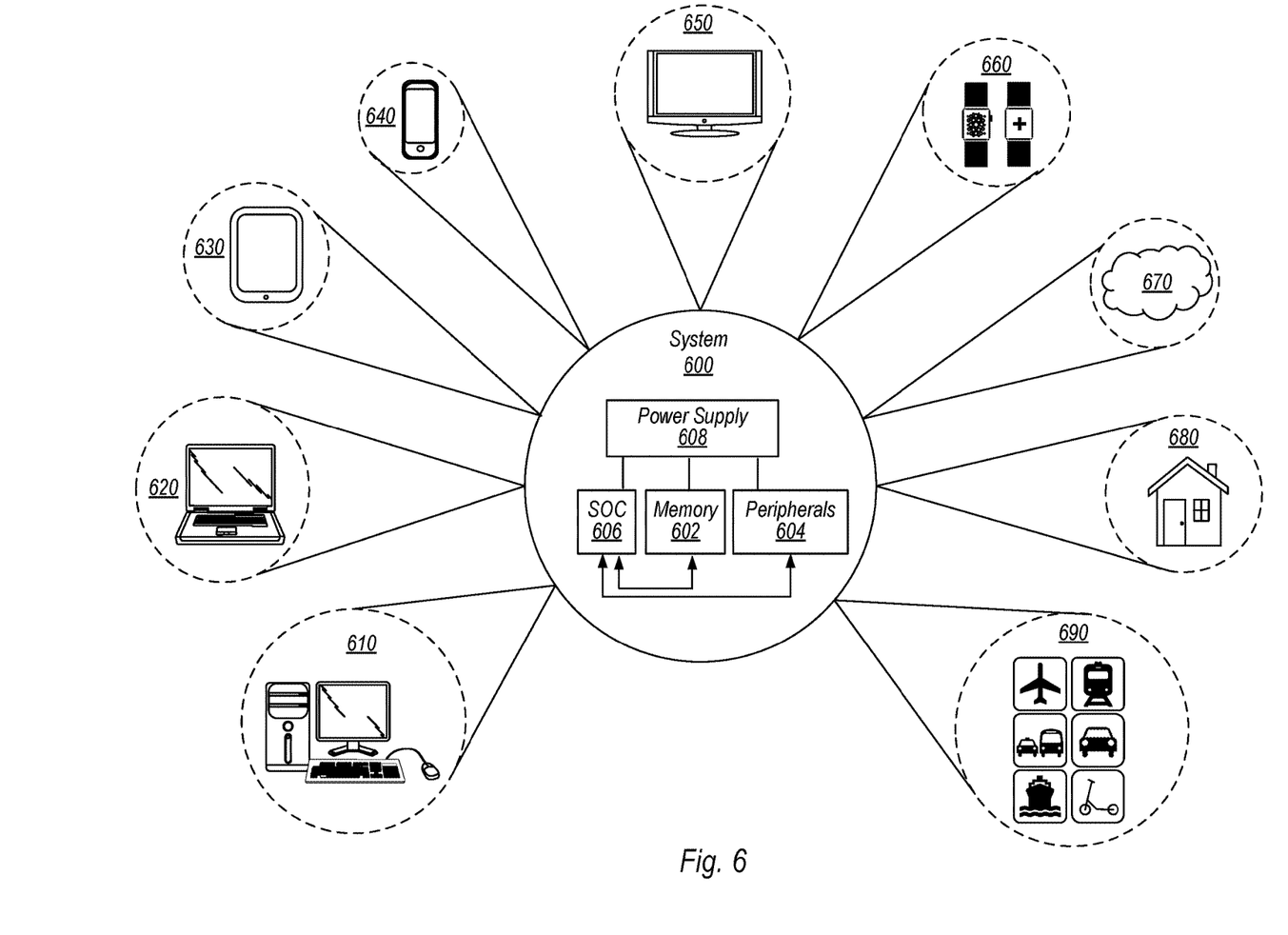
FIG. 6 is a block diagram of one embodiment of an example system.

Example System:

Turning next to FIG. 6, a block diagram of one embodiment of a system 600 is shown that may incorporate and/or otherwise utilize the methods and mechanisms described herein. In the illustrated embodiment, the system 600 includes at least one instance of a system on chip (SoC) 606 which may include multiple types of processing units, such as a central processing unit (CPU), a graphics processing unit (GPU), or otherwise, a communication fabric, and interfaces to memories and input/output devices. In some embodiments, one or more processors in SoC 606 includes multiple execution lanes and an instruction issue queue. In various embodiments, SoC 606 is coupled to external memory 602, peripherals 604, and power supply 608.

A power supply 608 is also provided which supplies the supply voltages to SoC 606 as well as one or more supply voltages to the memory 602 and/or the peripherals 604. In various embodiments, power supply 608 represents a battery (e.g., a rechargeable battery in a smart phone, laptop or tablet computer, or other device). In some embodiments, more than one instance of SoC 606 is included (and more than one external memory 602 is included as well). In various embodiments, one or more instances of a power converter as disclosed herein, including DCR sensing circuitry, may be implemented. For example, SoC 606 may have implemented thereon at least one instance of a buck converter that utilizes current mode control and thus includes an embodiment of the circuitry described herein for measuring inductor current.

The memory 602 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 604 include any desired circuitry, depending on the type of system 600. For example, in one embodiment, peripherals 604 includes devices for various types of wireless communication, such as Wi-Fi, Bluetooth, cellular, global positioning system, etc. In some embodiments, the peripherals 604 also include additional storage, including RAM storage, solid state storage, or disk storage. The peripherals 604 include user interface devices such as a display screen, including touch display screens or multi-touch display screens, keyboard or other input devices, microphones, speakers, etc.

As illustrated, system 600 is shown to have application in a wide range of areas. For example, system 600 may be utilized as part of the chips, circuitry, components, etc., of a desktop computer 610, laptop computer 620, tablet computer 630, cellular or mobile phone 640, or television 650 (or set-top box coupled to a television). Also illustrated is a smartwatch and health monitoring device 660. In some embodiments, smartwatch 660 may include a variety of general-purpose computing related functions. For example, smartwatch 660 may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 600 may further be used as part of a cloud-based service(s) 670. For example, the previously mentioned devices, and/or other devices, may access computing resources in the cloud (i.e., remotely located hardware and/or software resources). Still further, system 600 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 6 is the application of system 600 to various modes of transportation. For example, system 600 may be used in the control and/or entertainment systems of aircraft, trains, buses, cars for hire, private automobiles, waterborne vessels from private boats to cruise liners, scooters (for rent or owned), and so on. In various cases, system 600 may be used to provide automated guidance (e.g., self-driving vehicles), general systems control, and otherwise. These any many other embodiments are possible and are contemplated. It is noted that the devices and applications illustrated in FIG. 6 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on, Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus, comprising:
a coupled inductor power converter comprising:
a first switching circuit configured to source current to a first switch node that is coupled, via a first inductor, to a regulated power supply node;
a second switching circuit configured to source current to a second switch node that is coupled, via a second inductor, to the regulated power supply node, wherein the first and second inductors share a magnetic core;
a first filter circuit configured to filter a voltage level of a first terminal of the first inductor to generate a first filtered signal;
a second filter circuit configured to filter a voltage level of a second terminal of the first inductor to generate a second filtered signal;
a third filter circuit configured to filter a voltage level of a first terminal of the second inductor to generate a third filtered signal;
a fourth filter circuit configured to filter a voltage level of a second terminal of the second inductor to generate a fourth filtered signal;
a first capacitor coupled between the first and third filter circuits;
a second capacitor coupled between the second and fourth filter circuits; and
a control circuit configured to adjust operation of the first and second switching circuits using a voltage level of the regulated power supply node, and the first, second, third, and fourth filtered signals.

2. The apparatus of claim 1, further comprising a first measurement circuit configured to measure a first voltage difference between the first filtered signal and the second filtered signal, wherein the first voltage difference is proportional to a current through the first inductor.

3. The apparatus of claim 2, wherein the control circuit is coupled to receive the first voltage difference and is configured to adjust operation of the first switching circuit based on a comparison of the first voltage difference and a threshold value.

4. The apparatus of claim 3, wherein the threshold value corresponds to a current limit, and wherein the control circuit is configured to control the current through the first inductor based on the current limit.

5. The apparatus of claim 2, wherein the first filter circuit is configured to generate the first filtered signal on a first filter node, wherein the second filter circuit is configured to generate the second filtered signal on a second filter node, and wherein the first measurement circuit is coupled between the first filter node and the second filter node.

6. The apparatus of claim 2, further comprising a second measurement circuit configured to measure a second voltage difference between the third filtered signal and the fourth filtered signal, wherein the second voltage difference is proportional to a current through the second inductor.

7. The apparatus of claim 6, wherein the control circuit is coupled to receive the second voltage difference and is configured to adjust operation of the second switching circuit based on a comparison of the second voltage difference and a threshold value, wherein the threshold value corresponds to a current limit, and wherein the control circuit is configured to control the current through the second inductor based on the current limit.

8. The apparatus of claim 1, wherein the first filter circuit and the second filter circuit are low-pass filter circuits, wherein each of the low-pass filter circuits comprises a resistor and a capacitor.

9. The apparatus of claim 1, wherein the first switching circuit comprises a first switch coupled between the first switch node and an input voltage node and a second switch coupled between the first switch node and a ground node.

10. The apparatus of claim 9, wherein the control circuit is configured to alternately activate the first switch and the second switch to generate the voltage level on the regulated power supply node at a specified value.

11. A method comprising:
sourcing current, using a first switching circuit, to a first switch node, wherein the first switch node is coupled to a regulated power supply node via a first inductor;
sourcing current, using a second switching circuit, to a second switch node, wherein the second switch node is coupled to the regulated power supply node via a second inductor that shares a magnetic core with the first inductor;
filtering, using a first filter circuit, a voltage level of a first terminal of the first inductor to generate a first filtered signal;
filtering, using a second filter circuit, a voltage level of a second terminal of the first inductor to generate a second filtered signal;
filtering, using a third filter circuit, a voltage level of a first terminal of the second inductor to generate a third filtered signal; and
filtering, using a fourth filter circuit, a voltage level of a second terminal of the second inductor to generate a fourth filtered signal;
emulating coupling between the first and second inductors using a first capacitor coupled between the first and third filter circuits and a second capacitor coupled between the second and fourth filter circuits; and
adjusting, using a control circuit, operation of the first and second switching circuit using a voltage of the regulated power supply node, and the first, second, third and fourth filtered signals.

12. The method of claim 11, further comprising measuring, using a measurement circuit, a voltage difference between the first filtered signal and the second filtered signal, wherein the voltage difference is proportional to a current through the first inductor.

13. The method of claim 12, further comprising the control circuit adjusting operation of the first switching circuit based on comparisons of the voltage difference and one or more inductor current threshold values.

14. The method of claim 13, further comprising the control circuit controlling an amount of current through the first inductor.

15. The method of claim 11, wherein generating the first and second filtered signals comprises low-pass filtering voltage levels on the first and second terminals, respectively.

16. A system comprising:
a load circuit configured to operate according to a regulated supply voltage; and a coupled inductor power converter configured to generate the regulated supply voltage on a regulated supply voltage node, wherein the power converter includes:
a first switching circuit having a first switching node;
a second switching circuit having a second switching node;
a first inductor having a first terminal coupled to the first switching node, and a second terminal coupled to the regulated supply voltage node;
a second inductor having a first terminal coupled to the second switching node and a second terminal coupled to the regulated supply voltage node, wherein the first and second inductors share a magnetic core; and
a current sensing circuit including:
a first filter circuit configured to filter a voltage level of the first terminal of the first inductor to generate a first filtered signal;
a second filter circuit configured to filter a voltage level of the second terminal of the first inductor to generate a second filtered signal;
a third filter circuit configured to filter a voltage level of the first terminal of the second inductor to generate a third filtered signal;
a fourth filter circuit configured to filter a voltage level of the second terminal of the second inductor to generate a fourth filtered signal;
a first capacitor coupled between the first and third filter circuits;
a second capacitor coupled between the second and fourth filter circuits; and
a control circuit configured to adjust an operation of the first and second switching circuits using a voltage level of the regulated supply voltage node, and the first, second, third, and fourth filtered signals.

17. The system of claim 16, wherein the power converter further includes:
a first measurement circuit configured to determine a current through the first inductor based on measuring a difference between respective voltage levels of the first and second filtered signals, wherein the difference between the voltage levels of the first and second filtered signals is proportional to the current through the first inductor; and
a second measurement circuit configured to determine a current through the second inductor based on measuring a difference between respective voltage levels of the third and fourth filtered signals, wherein the difference between the voltage levels of the third and fourth filtered signals is proportional to the current through the second inductor.

18. The system of claim 17, wherein the control circuit is configured to perform current mode control of the first and second switching circuit based on comparisons of one or more current threshold values, the current through the first inductor, and the current through the second inductor.

19. The system of claim 18, wherein the control circuit is configured to cause the first switching circuit to source a current pulse to the first inductor by causing activation of a high side switch and further configured to discontinue sourcing the current pulse by deactivating the high side switch and activating a low side switch, wherein the control circuit is configured determine when to begin and when to discontinue sourcing the current pulse based on a comparison of at least one of the one or more current threshold values.

20. The system of claim 16, wherein the first, second, third, and fourth filter circuits are low-pass filter circuits.

* * * * *